United States Patent
Kim et al.

(10) Patent No.: US 7,998,365 B2
(45) Date of Patent: Aug. 16, 2011

(54) THIOGALLATE PHOSPHOR AND WHITE LIGHT EMITTING DEVICE EMPLOYING THE SAME

(75) Inventors: Kyung Nam Kim, Seoul (KR); Sang Mi Park, Seoul (KR); Tomizo Matsuoka, Seoul (KR)

(73) Assignee: Seoul Semiconductor Co., Ltd., Seoul (KR)

( * ) Notice: Subject to any disclaimer, the term of this patent is extended or adjusted under 35 U.S.C. 154(b) by 527 days.

(21) Appl. No.: 12/282,255

(22) PCT Filed: Mar. 10, 2006

(86) PCT No.: PCT/KR2006/000876
§ 371 (c)(1),
(2), (4) Date: Sep. 9, 2008

(87) PCT Pub. No.: WO2007/105836
PCT Pub. Date: Sep. 20, 2007

(65) Prior Publication Data
US 2009/0097225 A1    Apr. 16, 2009

(51) Int. Cl.
*C09K 11/84* (2006.01)
(52) U.S. Cl. .......... 252/301.4 S; 252/301.6 S; 313/503; 257/98
(58) Field of Classification Search ............ 252/301.4 S, 252/301.6 S; 257/98; 313/503
See application file for complete search history.

(56) References Cited

U.S. PATENT DOCUMENTS

| | | | |
|---|---|---|---|
| 3,639,254 A | 2/1972 | Peters | |
| 6,417,019 B1 | 7/2002 | Mueller et al. | |
| 6,617,782 B2* | 9/2003 | Cheong et al. | 313/503 |
| 6,695,982 B2 | 2/2004 | Ellens et al. | |
| 2003/0224221 A1* | 12/2003 | Cheong et al. | 428/704 |
| 2004/0124758 A1* | 7/2004 | Danielson et al. | 313/486 |

FOREIGN PATENT DOCUMENTS

| | | |
|---|---|---|
| DE | 10028266 | 12/2001 |
| KR | 10-2006-0028844 | 4/2006 |
| WO | 03-107441 | 12/2003 |
| WO | 2005-026285 | 3/2005 |

OTHER PUBLICATIONS

T. E. Peters, et al. "Luminescence and Structural Properties of Thiogallate Phosphors Ce+3 and Eu+2 -Activated Phosphors. Park I", Journal of Electrochemical Society, vol. 119, No. 2, Feb. 1, 1972, pp. 230-236, XP002034014.
European Search Report dated Feb. 18, 2009 for EP Application No. 06716326.1.

* cited by examiner

*Primary Examiner* — C. Melissa Koslow
(74) *Attorney, Agent, or Firm* — H.C. Park & Associates, PLC

(57) ABSTRACT

The present invention relates to a thiogallate phosphor which is excited by ultraviolet or blue light to emit light with a relatively longer wavelength than that of the ultraviolet or blue light. The phosphor is expressed as a general formula of $(A_{1-x-y}Eu_xM^{III}_y)(B_{2-y}M^{II}_y)S_4$, wherein $0.005 < x < 0.9$, $0 < y < 0.995$ and $x+y < 1$. Here, A is at least one element selected from the group consisting of Ba, Sr and Ca, B is at least one element selected from the group consisting of Al, Ga and In, $M^{III}$ is at least one rare earth element selected from the group consisting of Sc, La, Gd and Lu, and $M^{II}$ is at least one element consisting of Mg, Zn and Be. Accordingly, the luminous efficiency can be increased relative to the thiogallate phosphor with a general formula of $AB_2S_4:Eu$.

7 Claims, 3 Drawing Sheets

THIOGALLATE PHOSPHOR AND WHITE LIGHT EMITTING DEVICE EMPLOYING THE SAME

CROSS REFERENCE RELATED APPLICATIONS

This application is the National Stage of International Application No. PCT/KR2006/000876, filed Mar. 10, 2006, which is hereby incorporated by reference for all purposes as if fully set forth herein.

BACKGROUND OF THE INVENTION

1. Field of the Invention

The present invention relates to a phosphor and a light emitting device employing the same. More particularly, the present invention relates to a thiogallate phosphor with an improved luminous efficiency and a white light emitting device employing the thiogallate phosphor.

2. Discussion of the Background

In general, a white light emitting device includes a gallium nitride (GaN) based light emitting diode, particularly an aluminum-indium-gallium nitride ($Al_xIn_yGa_zN$) based light emitting diode, for emitting blue light, and a phosphor for absorbing a portion of the blue light emitted from the light emitting diode and then emitting yellow light. Since such a white light emitting device employs a single wavelength light source as a light source, it has a very simple structure and a low available price as compared with the white light emitting device employing light sources with different wavelengths.

For example, an yttrium-aluminum-garnet (YAG:Ce) phosphor employing a cerium ion ($Ce^{3+}$) as an activator, an orthosilicate phosphor representative by $Sr_2SiO_4$:Eu employing an europium ion ($Eu^{2+}$) as an activator, a thiogallate phosphor such as $CaGa_2S_4$:Eu may be used as a phosphor for use in the white light emitting device.

The YAG:Ce phosphor and the orthosilicate phosphor have relatively broad light emission spectra, the color rendering indices thereof are relatively high. However, in order to synthesize these phosphors, raw materials with very high purity and precise stoichiometric composition are required, and the raw materials should be heat treated at a temperature of over 1300° C. This increases the costs of the phosphors, and consequently, the manufacturing cost of the white light emitting device.

In the meantime, the thiogallate phosphor is expressed as a general formula of $AB_2S_4$:D, wherein A is at least one element selected from the group consisting of Ca, Sr and Ba, B is at least one element selected from the group consisting of Al, Ga and In, and D is an activator whose example is $Eu^{2+}$ or $Ce^{3+}$. The thiogallate phosphor can emit light with a various colors by controlling the kinds and concentrations of the elements and activator. For example, the synthesizing method and light emission characteristics of the thiogallate phosphors have been described in U.S. Pat. No. 3,639,254 issued to Peters and entitled "alkaline earth thiogallate phosphors," U.S. Pat. No. 6,417,019 issued to Mueller et al. and entitled "phosphor converted light emitting diode" and U.S. Pat. No. 6,695,982 issued to Ellens et al. and entitled "highly efficient florescent materials." As described in the above U.S. patents, light emitting colors with various wavelengths can be obtained by controlling the kinds of the element A or B expressed in the general formula.

However, a thiogallate phosphor with higher luminous efficiency has been continuously required, and studies on the thiogallate phosphor have also been continuously conducted.

Specifically, in the white light emitting device for illumination, a thiogallate phosphor with higher luminous efficiency which can be substituted for the YAG:Ce or orthosilicate phosphor has been still required.

Meanwhile, the thiogallate phosphor has a relatively narrow bandwidth, i.e. a relatively narrow bandwidth of the emission spectrum measured at the half peak intensity. Accordingly, the white light emitting device employing such a thiogallate phosphor may have a low color rendering index (CRI). The color rendering index is a numerical value indicating how closely the object's color appearance illuminated by a light source resembles the object's color appearance illuminated by a reference light source (e.g., sunlight) and is correlated with the wavelength distribution of light emitted outward. Accordingly, a white light emitting device which employs the thiogallate phosphor with a narrow bandwidth and can improve the color rendering index is required to implement an illumination similar to the sunlight.

SUMMARY OF THE INVENTION

Accordingly, an object of the present invention is to provide a thiogallate phosphor which can be substituted for a YAG:Ce or orthosilicate phosphor.

Another object of the present invention is to provide a thiogallate phosphor with improved luminous efficiency.

A further object of the present invention is to provide a white light emitting device employing the thiogallate phosphor.

A still further object of the present invention is to provide a white light emitting device which employs the thiogallate phosphor and can improve the color rendering index.

According to an aspect of the present invention for achieving the objects, there is provided a thiogallate phosphor which is excited by ultraviolet or blue light to emit light with a relatively longer wavelength than that of the exciting light. A phosphor according to an aspect of the present invention is expressed as a general formula of $(A_{1-x-y}Eu_xM^{III}_y)(B_{2-y}M^{II}_y)S_4$, wherein $0.005<x<0.9$, $0<y<0.995$ and $x+y<1$. Here, A is at least one element selected from the group consisting of Ba, Sr and Ca, B is at least one element selected from the group consisting of Al, Ga and In, $M^{III}$ is at least one rare earth element selected from the group consisting of Sc, La, Gd and Lu, and $M^{II}$ is at least one element consisting of Mg, Zn and Be. $M^{III}$ is a trivalent cation, and $M^{II}$ is a divalent cation. Since $M^{III}$ and $M^{II}$ are substituted for the sites A and B by the same amounts, respectively, the charge balance can be achieved. In particular, since $M^{III}$ and $M^{II}$ have ion radii similar to those of the elements positioned at the sites A and B, respectively, the magnitude of the crystal field splitting of activators is hardly changed, and thus, the luminous efficiency can be increased while the emission wavelength is maintained.

Specifically, a phosphor according to an embodiment of the present invention may be expressed as a general formula of $(Ca_{1-x-y}Eu_xM^{III}_y)(Ga_{2-y}M^{II}_y)S_4$, wherein $0.005<x<0.9$, $0 \leq y \leq 0.995$ and $x+y<1$. Here, $M^{III}$ is at least one rare earth element selected from the group consisting of Sc, La, Gd and Lu, and $M^{II}$ is at least one element selected from the group consisting of Mg and Zn. Preferably, $M^{III}$ may be Sc.

Meanwhile, in some embodiments of the present invention, x may be within a range of 0.01 to 0.9 while y may be within a range of 0.2 to 0.8.

According to another aspect of the present invention, a white light emitting device comprises a light emitting diode for emitting ultraviolet or blue light; and the aforementioned thiogallate phosphor positioned above the light emitting diode to convert a portion of the light emitted from the light emitting diode into light with a relatively longer wavelength than that of the emitted light. In particular, the light emitting diode may be a light emitting diode which emits blue light, and the phosphor may be a thiogallate phosphor which absorbs blue light and emits yellow light. Preferably, the white light emitting device may further comprise an orthosilicate phosphor which is expressed as $(Ca,Sr,Ba)_2SiO_4$:Eu. The spectrum of the wavelength emitted from the orthosilicate phosphor is broad, so that the color rendering index of the white light can be improved.

According to the present invention, a thiogallate phosphor with improved luminous efficiency can be provided. Since the thiogallate phosphor can be economically synthesized and the luminous efficiency is improved as compared with the conventional thiogallate phosphor, the thiogallate phosphor can be substituted for the YAG:Ce or orthosilicate phosphor. The thiogallate phosphor according to the present invention can be used to provide a white light emitting device. Further, an orthosilicate phosphor can be selectively used to provide a white light emitting device capable of improving the color rendering index.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE ILLUSTRATED EMBODIMENTS

Hereinafter, preferred embodiments of the present invention will be described in detail with reference to the accompanying drawings.

Figure 1:
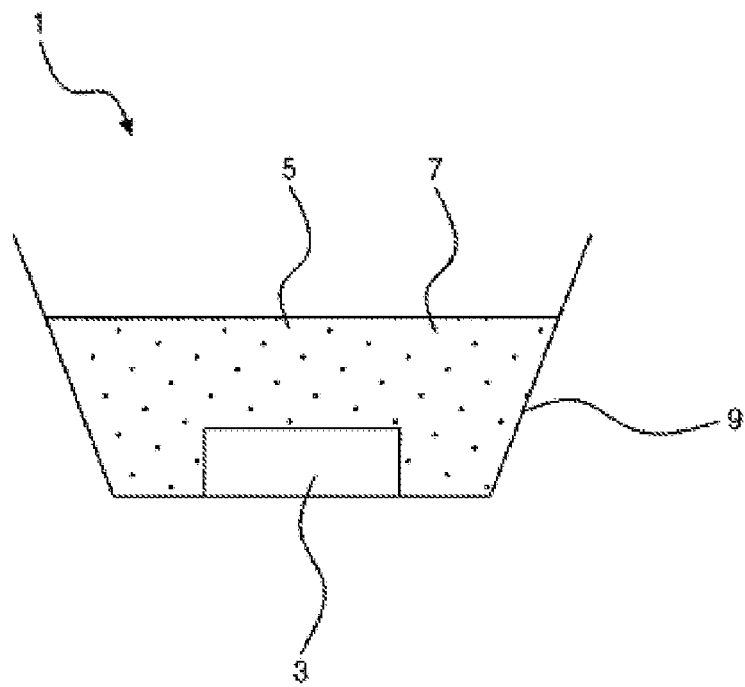
FIG. 1 is a sectional view illustrating a white light emitting device according to an embodiment of the present invention.

FIG. 1 is a schematic sectional view illustrating a white light emitting device 1 according to an embodiment of the present invention.

Referring to FIG. 1, the white light emitting device 1 comprises a light emitting diode 3 and a phosphor 7. The light emitting diode 3 is an $Al_xIn_yGa_zN$ based light emitting diode which emits ultraviolet or blue light, wherein $x+y+z=1$ and $0 \leq x,y,z \leq 1$. Specifically, the light emitting diode 3 may be a light emitting diode which emits blue light with a range of 420 nm to 480 nm.

Generally, the light emitting diode 3 includes two electrodes for connecting with an external power supply. The two electrodes may be positioned either on the same side of the light emitting diode 3 or on the opposite sides of the light emitting diode 3. The two electrodes may be electrically connected to the lead terminals (not shown) through adhesives or through bonding wires (not shown).

The light emitting diode 3 may be disposed within a reflective cup 9. The reflective cup 9 reflects light emitted from the light emitting diode 3 into a desired viewing angle such that the luminance within a predetermined viewing angle can be increased. Accordingly, the reflective cup 9 has a suitable inclined surface in accordance with the desired viewing angle.

Meanwhile, the phosphor 7 is positioned above the light emitting diode 3 to allow a portion of light emitted from the light emitting diode 3 to be converted into relatively long wavelength light. At this time, the phosphor 7 may be positioned and dispersed in a molding member 5. The molding member 5 covers the light emitting diode 3 to protect the light emitting diode 3 from an external environment such as moisture or external force. The molding member 5 may be epoxy or silicone and may be positioned in the reflective cup 9 as shown in this figure In a case where the light emitting diode 3 emits blue light, the phosphor 7 may comprise a thiogallate phosphor for emitting yellow light. As such, the blue light emitted from the light emitting diode 3 and the yellow light emitted from the phosphor 7 are mixed to emit white light outward. Alternatively, the phosphor 7 can comprise both a green light emitting phosphor and a red light emitting phosphor. At this time, the phosphor 7 includes a thiogallate phosphor excited by the blue light to emit green light and/or a thiogallate phosphor excited by blue light to emit red light. In a case where the light emitting diode 3 emits ultraviolet light, the phosphor 7 includes other phosphor excited by the ultraviolet light to emit blue light. The above other phosphor may be also a thiogallate phosphor.

The thiogallate phosphor according to the embodiment of the present invention is expressed as a general formula of $(A_{1-x-y}Eu_xM^{III}_y)(B_{2-y}M^{II}_y)S_4$, wherein $0.005 < x < 0.9$, $0 < y < 0.995$ and $x+y < 1$. Here, A is at least one element selected from the group consisting of Ba, Sr and Ca, B is at least one element selected from the group consisting of Al, Ga and In, $M^{III}$ is at least one rare earth element selected from the group consisting of Sc, La, Gd and Lu, and $M^{II}$ is at least one element selected from the group consisting of Mg, Zn and Be. Since $M^{III}$ and $M^{II}$ are substituted for the sites of A and B by the same amounts, respectively, the charge balance can be achieved. Specifically, $M^{III}$ and $M^{II}$ can be selected to have ion radii similar to those of the elements positioned at the sites of A and B, respectively. Accordingly, since the magnitude of the crystal field splitting of the activator is hardly changed, the luminous efficiency can be increased while the emission wavelength of the phosphor with a composition prior to the substitution is still maintained.

In some embodiments of the present invention, x may be within a range of 0.01 to 0.9 while y may be within a range of 0.2 to 0.8.

Specifically, the thiogallate phosphor which emits yellow light according to the present invention can be expressed as a general formula of $(Ca_{1-x-y}Eu_xM^{III}_y)(Ga_{2-y}M^{II}_y)S_4$, wherein $0.005 < x < 0.9$, $0 < y < 0.995$ and $x+y < 1$. That is, A and B are specified as Ca and Ga, respectively, as described in the general formula. Here, $M^{III}$ is at least one rare earth element selected from the group consisting of Sc, La, Gd and Lu, and $M^{III}$ is at least one element selected from Mg and Zn. Since $M^{III}$ has an ion radius similar to that of Ca, $M^{III}$ is positioned at the site of Ca in the phosphor crystal structure. Further, since $M^{II}$ has an ion radius similar to that of Ga, $M^{II}$ is positioned at the site of Ga. As described in the above U.S. Pat. No. 6,417,019, the $CaGa_2S_4$:Eu phosphor emits yellow light with a wavelength of about 560 nm. Accordingly, the thiogallate phosphor according to the embodiment of the present invention emits the yellow light with a wavelength almost similar to that of the $CaGa_2S_4$:Eu phosphor. Furthermore, the thiogallate phosphor according to the embodiment of the present invention increases the luminous efficiency as compared with the CaGa$_2$S$_4$:Eu phosphor.

Meanwhile, the white light emitting device 1 further includes an orthosilicate phosphor which is expressed as (Ca, Sr,Ba)$_2$SiO$_4$:Eu. The orthosilicate phosphor may be distributed within the molding member 5 together with the thiogallate phosphor. Since the orthosilicate phosphor has a broad bandwidth of the emitted light, the color rendering index of the white light can be increased.

The thiogallate phosphor may be synthesized using a solid state reaction. Hereinafter, a method of synthesizing the (Ca$_{1-x-y}$ Eu$_x$Sc$_y$)(Ga$_{2-y}$Zn$_y$)S$_4$ thiogallate phosphor using the solid state reaction will be described.

First, raw materials are prepared. Calcium carbonate (CaCO$_3$) or calcium sulfide (CaS) may be used as a Ca raw material; europium oxide (Eu$_2$O$_3$) or europium sulfide (Eu$_2$S$_3$) may be used as an Eu raw material; scandium oxide (Sc$_2$O$_3$) or scandium nitrate (Sc(NO$_3$)$_2$) may be used as a Sc raw material; gallium oxide (Ga$_2$O$_3$) or gallium sulfide (Ga$_2$S$_3$) may be used as a Ga raw material; and zinc oxide (ZnO) or zinc sulfide (ZnS) may be used as a Zn raw material. The raw materials used to synthesize the thiogallate phosphor may have purity lower than those used to synthesize the YAG:Ce phosphor.

The high purity raw material with purity of 99.999% is generally used to synthesize the YAG:Ce phosphor, but the raw material with purity of 99.9% can be used to obtain the thiogallate phosphor according to the embodiment of the present invention.

The raw materials are mixed at a required composition ratio. The raw materials may be mixed by a dry or wet process, and ethanol may be used during the wet mixing process. A ball milling process may also be used to uniformly mix the raw materials with one another.

The mixed raw materials are heat-treated and sintered at a temperature range of 800° C. to 1100° C. under H$_2$S atmosphere. Before the heat treatment, the mixed raw materials may be heated at a lower temperature to evaporate ethanol therein. In order to synthesize the YAG:Ce or orthosilicate phosphor, the heat treatment under about 1600° C. is required. A flux should be added in order to lower the heat treatment temperature. However, the thiogallate phosphor according to the embodiments of the present invention can be sintered at a relatively lower temperature, and the phosphor with the desired composition can be synthesized and obtained.

After the heat treatment, the synthesized phosphors can be further milled and mixed again to perform the secondary heat treatment. The secondary heat treatment may be performed under the same conditions as the previous heat treatment. Accordingly, the phosphor with more uniform composition can be synthesized and obtained.

EXPERIMENTAL EXAMPLES

Figure 2:
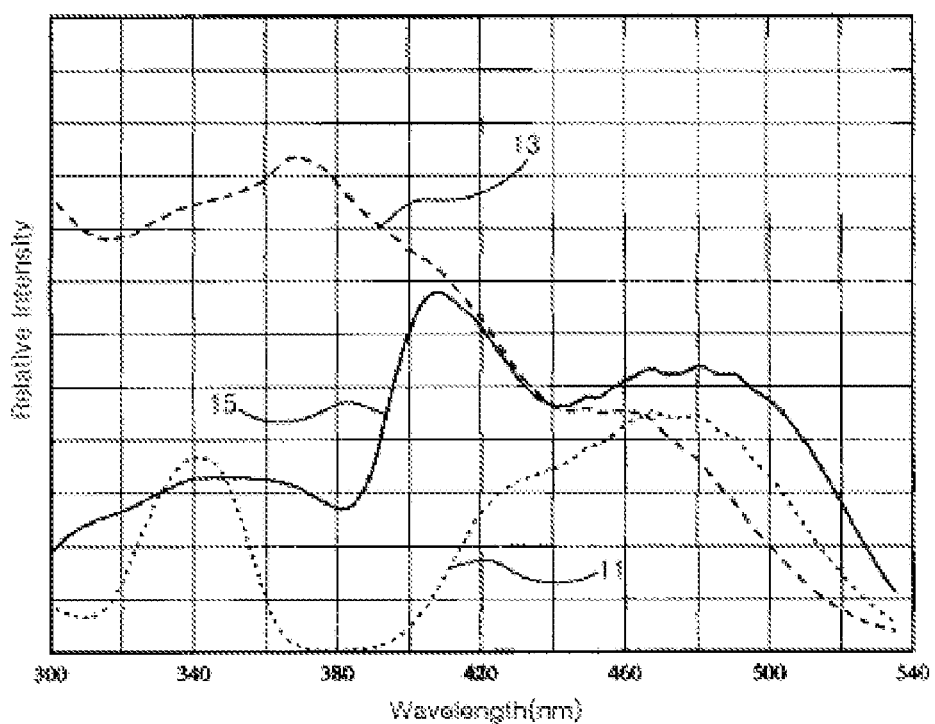
FIG. 2 is a graph illustrating excitation spectra of the conventional phosphors.
Figure 3:
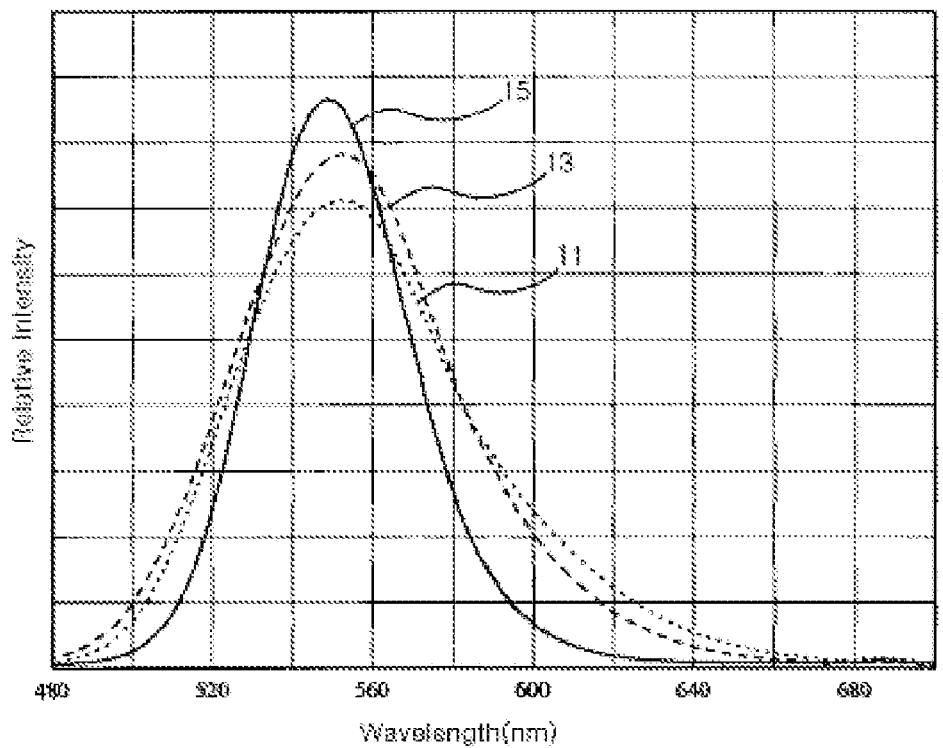
FIG. 3 is a graph illustrating emission spectra of the conventional phosphors.
Figure 4:
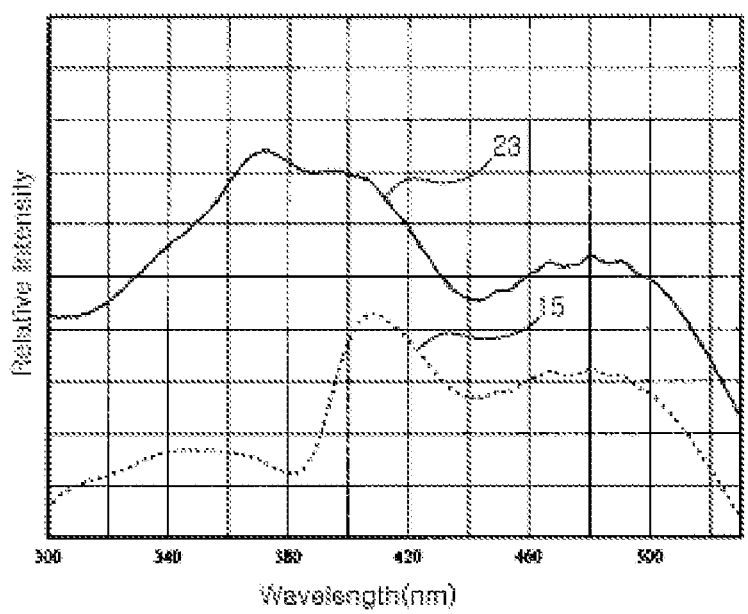
FIG. 4 is a graph illustrating excitation spectra of the conventional thiogallate phosphor and the thiogallate phosphor according to the embodiment of the present invention.
Figure 5:
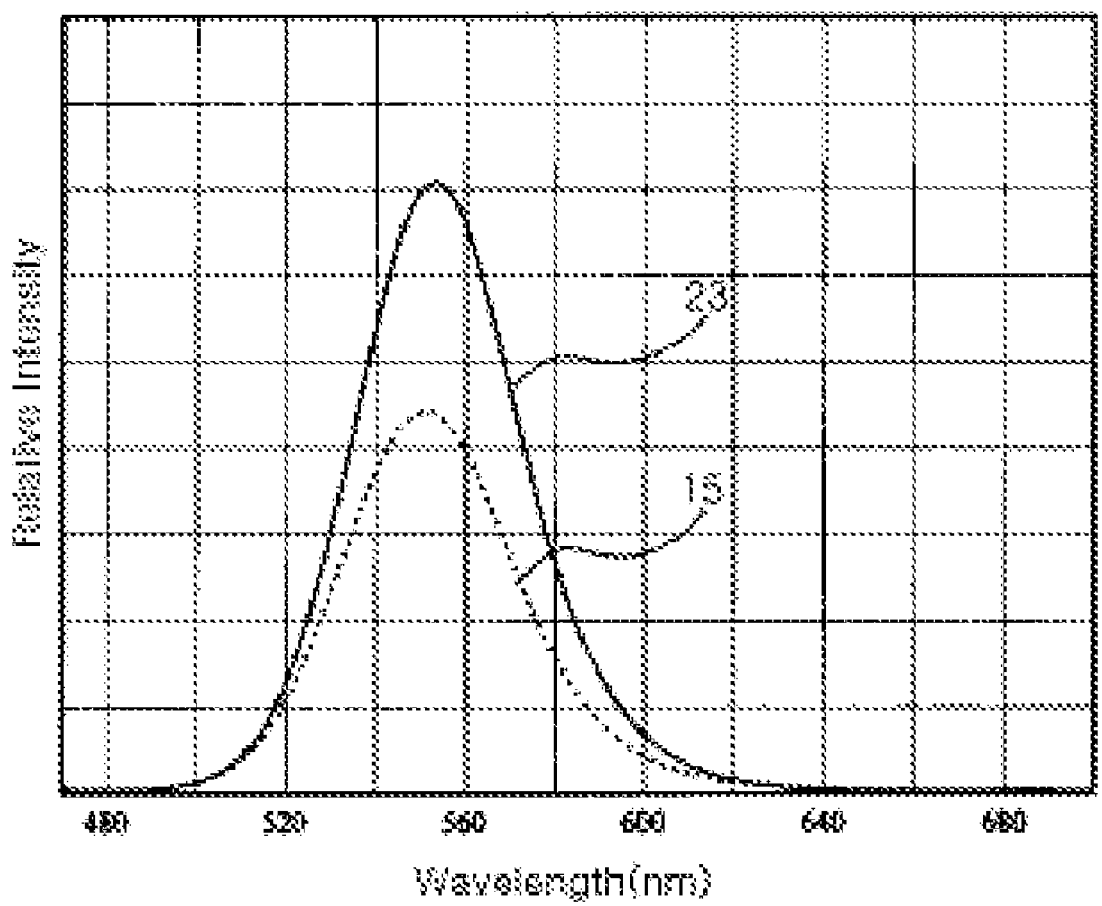
FIG. 5 is a graph illustrating emission spectra of the conventional thiogallate phosphor and the thiogallate phosphor according to the embodiment of the present invention.

Hereinafter, the excitation and emission spectra of the conventional phosphors and the phosphors according to the embodiment of the present invention will be described. FIGS. 2 and 3 are graphs illustrating the excitation and emission spectra of various phosphors according to the prior art, respectively; and FIGS. 4 and 5 are graphs illustrating the excitation and emission spectra of the conventional thiogallate phosphor and the thiogallate phosphor according to the embodiment of the present invention, respectively. Here, the excitation and emission spectra were measured by using the FP-6200 fluorescence spectrometer manufactured by Jasco, Inc., and a xenon lamp was used as an excitation light source.

The excitation spectrum was measured on the basis of the wavelength of 550 nm in the emission spectrum, and the emission spectrum was measured by using the excitation light with a wavelength of 460 nm. Meanwhile, the phosphor with the composition of Ca$_{0.96}$Ga$_2$S$_4$:Eu$_{0.04}$ was used as the conventional thiogallate phosphor 15, while the phosphor with the composition of (Ca$_{0.36}$Sc$_{0.6}$)(Ga$_{1.4}$Zn$_{0.6}$)S$_4$:Eu$_{0.04}$ was used as the thiogallate phosphor 23 according to the embodiment of the present invention.

Referring to FIG. 2, the intensity in the excitation spectrum of the conventional thiogallate phosphor 15 was relatively stronger than that of the YAG:Ce phosphor 11 throughout nearly all the wavelength regions. The intensity in the excitation spectrum of the conventional thiogallate phosphor 15 was relatively stronger than that of the orthosilicate (Sr,Ba)$_2$SiO$_4$:Eu phosphor 13 in the wavelength region of 440 nm or more and almost similar to that of the (Sr,Ba)$_2$SiO$_4$:Eu phosphor 13 in the wavelength region of 420 nm to 440 nm.

Referring to FIG. 3, the peak intensity of the thiogallate phosphor 15 was relatively stronger than those of the YAG:Ce phosphor 11 and the (Sr,Ba)$_2$SiO$_4$:Eu phosphor 13, but the bandwidth of the thiogallate phosphor 15 is narrower than those of the YAG:Ce phosphor 11 and the (Sr,Ba)$_2$SiO$_4$:Eu phosphor 13.

Consequently, it is believed that the total luminous intensity of the thiogallate phosphor 15 is almost similar to or weaker than those of the YAG:Ce phosphor 11 and the (Sr, Ba)$_2$SiO$_4$:Eu phosphor 13 in the yellow light region for the same excitation light source.

Referring to FIG. 4, the intensity in the excitation spectrum of the thiogallate (Ca$_{0.36}$Sc$_{0.6}$)(Ga$_{1.4}$Zn$_{0.6}$)S$_4$:Eu$_{0.04}$ phosphor 23 according to the embodiment of the present invention was stronger than that of the conventional thiogallate phosphor 15 in all the measured wavelength regions, particularly in the ultraviolet and blue light regions.

Referring to FIG. 5, it has been shown that the peak intensity of the thiogallate phosphor 23 according to the embodiment of the present invention was relatively stronger than that of the conventional thiogallate phosphor 15 at the wavelength of about 550 nm. On the other hand, it has been shown that the bandwidths, i.e. the bandwidths measured at the half peak intensity, of the thiogallate phosphors 15 and 23 were similar to each other.

Consequently, it can be understood that the luminous intensity of the thiogallate phosphor 23 according to the embodiment of the present invention has been improved as compared with that of the conventional thiogallate phosphor 15 for the same excitation light source. Therefore, the luminous efficiency of the thiogallate phosphor has been increased.

The invention claimed is:

1. A phosphor with a general formula of $(A_{1-x-y}Eu_xM^{III}_y)(B_{2-y}M^{II}_y)S_4$, wherein A is at least one element selected from the group consisting of Ba, Sr and Ca, B is at least one element selected from the group consisting of Al, Ga and In, $M^{III}$ is at least one rare earth element selected from the group consisting of Sc, La, Gd and Lu, $M^{II}$ is at least one element consisting of Mg, Zn and Be, 0.005<x<0.9, 0<y<0.995, and x+y<1.

2. A phosphor with a general formula of $(Ca_{1-x-y}Eu_xM^{III}_y)(Ga_{2-y}M^{II}_y)S_4$, wherein $M^{III}$ is at least one rare earth element selected from the group consisting of Sc, La, Gd and Lu, $M^{II}$ is at least one element selected from the group consisting of Mg, Zn and Be, 0.005<x<0.9, 0<y<0.995 and x+y<1.

3. A phosphor with a general formula of $(Ca_{1-x-y}Eu_xM^{III}_y)(Ga_{2-y}M^{II}_y)S_4$, wherein $M^{III}$ is Sc, $M^{II}$ is one element selected from the group consisting of Mg and Zn, 0.005<x<0.9, 0<y<0.995 and x+y<1.

4. The phosphor as claimed in claim 1, wherein $0.01 \leqq x \leqq 0.9$ and $0.2 \leqq y \leqq 0.8$.

5. A white light emitting device, comprising:

a light emitting diode for emitting ultraviolet or blue light; and a phosphor according to claim 1, said phosphor being positioned above the light emitting diode to convert a portion of the light emitted from the light emitting diode into light with a relatively longer wavelength than that of the emitted light.

6. The white light emitting device as claimed in claim 5, wherein the light emitting diode emits blue light with a wavelength of 420 nm to 480 nm, and the phosphor converts a portion of the blue light into yellow light.

7. The white light emitting device as claimed in claim 5, further comprising an orthosilicate based phosphor positioned above the light emitting diode to convert a portion of the light emitted from the light emitting diode into light with a relatively longer wavelength than that of the emitted light.

* * * * *